(12) United States Patent
Parian et al.

(10) Patent No.: US 12,352,902 B2
(45) Date of Patent: Jul. 8, 2025

(54) DYNAMIC SELF-CALIBRATING OF AUXILIARY CAMERA OF LASER SCANNER

(71) Applicant: FARO Technologies, Inc., Lake Mary, FL (US)

(72) Inventors: Jafar Amiri Parian, Schlieren (CH); Hani Kaabi, Korntal-Münchingen (DE)

(73) Assignee: FARO Technologies, Inc., Lake Mary, FL (US)

( * ) Notice: Subject to any disclaimer, the term of this patent is extended or adjusted under 35 U.S.C. 154(b) by 885 days.

(21) Appl. No.: 17/492,801

(22) Filed: Oct. 4, 2021

(65) Prior Publication Data

US 2022/0128671 A1    Apr. 28, 2022

Related U.S. Application Data

(60) Provisional application No. 63/105,505, filed on Oct. 26, 2020.

(51) Int. Cl.
| | |
|---|---|
| *G01S 7/497* | (2006.01) |
| *G01S 17/894* | (2020.01) |
| *G06T 7/521* | (2017.01) |

(52) U.S. Cl.
CPC ............ *G01S 7/497* (2013.01); *G01S 17/894* (2020.01); *G06T 7/521* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 8,705,012 | B2 | 4/2014 | Greiner et al. |
| 9,563,958 | B1 * | 2/2017 | Choi .................... G06T 5/50 |
| 10,656,617 | B2 | 5/2020 | Pfeffer et al. |

(Continued)

OTHER PUBLICATIONS

Biber et al., 3D Modeling of Indoor Environments by a Mobile Platform with a Laser Scanner and Panoramic Camera, 13th European Signal Processing Conference, IEEE, Sep. 4, 2005, 4 pages.

(Continued)

*Primary Examiner* — Raul J Rios Russo
*Assistant Examiner* — Carl F. R. Tchatchouang
(74) *Attorney, Agent, or Firm* — McCarter & English, LLP; Dave S. Christensen

(57) ABSTRACT

A method includes capturing, by a three-dimensional (3D) scanner, a 3D point cloud, and capturing, by a camera, a control image by capturing and stitching multiple images of the surrounding environment. The method further includes capturing, by an auxiliary camera, an ultrawide-angle calibration image. The method further includes dynamically calibrating the auxiliary camera using the 3D point cloud, the control image, and the calibration image. The calibrating includes extracting a first plurality of features from the control image and extracting a second plurality of features from the calibration image. Further, a set of matching features are determined from the first and second sets of features. A set of control points is generated using the set of matching features by determining points in the 3D point cloud that correspond to the set of matching features. Further, a self-calibration of the auxiliary camera is performed using the set of control points.

20 Claims, 13 Drawing Sheets

(56) References Cited

U.S. PATENT DOCUMENTS

| | | |
|---|---|---|
| 11,054,546 B2 | 7/2021 | Ossig et al. |
| 2017/0372488 A1* | 12/2017 | Brown .................... G06T 7/50 |
| 2019/0066337 A1 | 2/2019 | Mares et al. |
| 2021/0103040 A1* | 4/2021 | Chung ................ G01S 17/931 |
| 2022/0051422 A1 | 2/2022 | Parian |

OTHER PUBLICATIONS

Cheng et al., Registration of Laser Scanning Point Clouds: A Review, Sensors, vol. 18, No. 5, May 21, 2018, pp. 1-25.

Extended European Search Report; Issued: Mar. 23, 2022; Application No. 21203076.1; filed: Oct. 18, 2021; 8 pages.

Khurana et al., "Extrinsic Calibration Methods for Laser Range Finder and Camera: A Systematic Review," Mapan—Journal of Metrology Society of India, vol. 36, No. 3, Aug. 23, 2021, pp. 669-690.

Parian et al., "Sensor modeling, self-calibration and accuracy testing of panoramic cameras and laster scanners," SPRS Journal of Photogrammetry and Remote Sensing, vol. 65, No. 1, Jan. 1, 2010, pp. 60-76.

Shi et al., "Fusion of a panoramic camera and 2D laser scanner data for constrained bundle adjustment in GPS-denied environments," Image and Vision Computing, vol. 40, Aug. 1, 2015, pp. 28-37.

\* cited by examiner

810

| Function | Domain | Range |
|---|---|---|
| $\sin^{-1}(x)$ | $[-1, 1]$ | $\left[-\frac{\pi}{2}, \frac{\pi}{2}\right]$ |
| $\cos^{-1}(x)$ | $[-1, 1]$ | $[0, \pi]$ |
| $\tan^{-1}(x)$ | $(-\infty, \infty)$ | $\left(-\frac{\pi}{2}, \frac{\pi}{2}\right)$ |
| $\cot^{-1}(x)$ | $(-\infty, \infty)$ | $(0, \pi)$ |
| $\sec^{-1}(x)$ | $(-\infty, -1] \cup [1, \infty)$ | $\left[0, \frac{\pi}{2}\right) \cup \left(\frac{\pi}{2}, \pi\right]$ |
| $\csc^{-1}(x)$ | $(-\infty, -1] \cup [1, \infty)$ | $\left[-\frac{\pi}{2}, 0\right) \cup \left(0, \frac{\pi}{2}\right]$ |

1100

1110

DYNAMIC SELF-CALIBRATING OF AUXILIARY CAMERA OF LASER SCANNER

CROSS-REFERENCE TO RELATED APPLICATIONS

This application claims the benefit of U.S. Provisional Application Ser. No. 63/105,505, filed Oct. 26, 2020, the entire disclosure of which is incorporated herein by reference.

BACKGROUND

The subject matter disclosed herein relates to the use of a 3D laser scanner time-of-flight (TOF) coordinate measurement device. A 3D laser scanner of this type steers a beam of light to a non-cooperative target, such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations, and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., azimuth and a zenith angle), and optionally a gray-scale value. This raw scan data is collected, stored, and sent to one or more processors to generate a 3D image representing the scanned area or object.

Generating an image requires at least three values for each data point. These three values may include the distance and two angles or transformed values, such as the x, y, z coordinates. In an embodiment, an image is also based on a fourth gray-scale value, which is a value related to the irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or another angle transducer). The beam steering mechanism also includes a second motor that steers the beam of light about a second axis by a second angle that is measured by a second angular encoder (or another angle transducer).

Many contemporary laser scanners include a color camera mounted on the laser scanner for gathering digital images of the environment and for presenting the digital images to an operator of the laser scanner. By viewing the camera images, the operator of the scanner can determine the field of view of the measured volume and adjust settings on the laser scanner to measure over a larger or smaller region of space. In addition, the digital images may be transmitted to a processor to add color to the scanner image. To generate a color scanner image, at least three positional coordinates (such as x, y, z) and three color values (such as red, green, blue "RGB") are collected for each data point.

Some 3D scanners use high dynamic range (HDR) techniques with the color camera to provide enhanced color images that are used with the scanner image to provide a more accurate color representation of the scanned environment. HDR techniques involve acquiring multiple images at each location with different exposure settings. These images are then combined to provide a resulting image that more accurately represents the environment. Another option for HDR, sometimes named interference mode, is to apply different exposure times to different parts of one captured image. This technique is useful in areas having high contrast (light and dark areas). While HDR images are certainly useful in enhancing the color of the scanner image, the acquiring of multiple images at different exposures can be time-consuming. For example, to acquire images in a 360 spherical area about the 3D scanner may take more than 60 images. If each of these 60 images has multiple exposures, then the time to acquire all of the images may be lengthy.

Accordingly, while existing 3D scanners are suitable for their intended purposes, what is needed is a 3D scanner having certain features of embodiments of the present disclosure.

BRIEF DESCRIPTION

A system includes a three-dimensional (3D) scanner that captures a 3D point cloud that comprises a plurality of 3D coordinates corresponding to one or more objects scanned in a surrounding environment. The system further includes a camera that captures a control image by capturing a plurality of images of the surrounding environment, wherein images from the plurality of images are stitched to form the control image. The system further includes an auxiliary camera that captures a calibration image by acquiring an ultrawide-angle image of the surrounding environment. The system further includes one or more processors that dynamically calibrate the auxiliary camera using the 3D point cloud, the control image, and the calibration image. Calibrating the auxiliary camera includes performing a method that includes extracting a first plurality of features from the control image using a feature-extraction algorithm. The method further includes extracting a second plurality of features from the calibration image using the feature-extraction algorithm. The method further includes determining a set of matching features from the first plurality of features and the second plurality of features by using a feature-matching algorithm. The method further includes building a set of control points using the set of matching features by determining points in the 3D point cloud that correspond to the set of matching features. The method further includes performing self-calibration of the auxiliary camera using the set of control points.

According to one or more embodiments, a method includes capturing, by a three-dimensional (3D) scanner, a 3D point cloud that comprises a plurality of 3D coordinates corresponding to one or more objects scanned in a surrounding environment. The method further includes capturing, by a camera, a control image by capturing a plurality of images of the surrounding environment, wherein images from the plurality of images are stitched to form the control image. The method further includes capturing, by an auxiliary camera, a calibration image by acquiring an ultrawide-angle image of the surrounding environment. The method further includes dynamically calibrating, by one or more processors, the auxiliary camera using the 3D point cloud, the control image, and the calibration image. Calibrating the auxiliary camera includes extracting a first plurality of features from the control image using a feature-extraction algorithm. Calibrating the auxiliary camera further includes extracting a second plurality of features from the calibration image using the feature-extraction algorithm. Calibrating the auxiliary camera further includes determining a set of matching features from the first plurality of features and the second plurality of features by using a feature-matching algorithm. Calibrating the auxiliary camera further includes building a set of control points using the set of matching features by determining points in the 3D point cloud that correspond to the set of matching features. Calibrating the auxiliary camera further includes performing self-calibration of the auxiliary camera using the set of control points.

According to one or more embodiments, a computer program product includes a memory device with computer-executable instructions stored thereon. The computer-executable instructions, when executed by one or more processors, cause one or more processors to perform the method.

In one or more embodiments, the ultrawide-angle image used as the calibration image has an angular field of view of at least 180°.

In one or more embodiments, extracting the second plurality of features from the calibration image includes transforming the ultrawide-angle image to a spherical image and extracting the second plurality of features from the spherical image.

In one or more embodiments, the auxiliary camera includes two lenses at predetermined offsets relative to each other. The offsets between the two lenses are used as conditions to perform the self-calibration of the auxiliary camera.

In one or more embodiments, determining the points in the 3D point cloud that correspond to the set of matching features is performed using bilinear interpolation.

In one or more embodiments, the camera is an integral part of the 3D scanner.

In one or more embodiments, the auxiliary camera is mounted on the 3D scanner at a predetermined position relative to the 3D scanner.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments herein relate to a 3D measuring device having a 3D scanner and at least one camera that has an ultrawide-angle lens to capture color images. Embodiments provide advantages to acquiring three-dimensional (3D) coordinates of an area of the environment, acquiring a 2D color image of that area using the camera, and mapping the 2D ultrawide-angle image to the 3D coordinates. The result is an interactive 3D scan of the area that includes the captured 3D coordinates and color. Embodiments provide advantages in reducing the time required to acquiring the color images and colorizing the captured 3D coordinates, particularly in comparison to all existing techniques. In the existing techniques, the scanner system rotates (vertically and horizontally) to different viewing directions, and the camera captures images. Depending on the camera field of view, the number of images captured varies. For a typical technological case, a built-in camera with a nodal point, which is identical to the laser scanner nodal point (no parallax), takes many images due to a narrow camera field of view. In other technological cases, in which the camera has a parallax to the laser scanner, a wider field of view camera is used. Embodiments described herein facilitate using a lower number of images in comparison to the built-in camera and external wide-angle camera techniques to cover the 360° environment.

Further, a technical challenge with 3D measuring devices is that using collinearity conditions alone cannot model precisely the mapping of 3D points into an image space associated with the camera because of systematic errors. Typically, a sensor model specific to the camera is used to map the 3D points with the image space of the camera. However, the sensor model is based on one or more parameters that have to be determined and calibrated for the camera and 3D scanner to work together to provide precise 3D scans.

Figure 1:
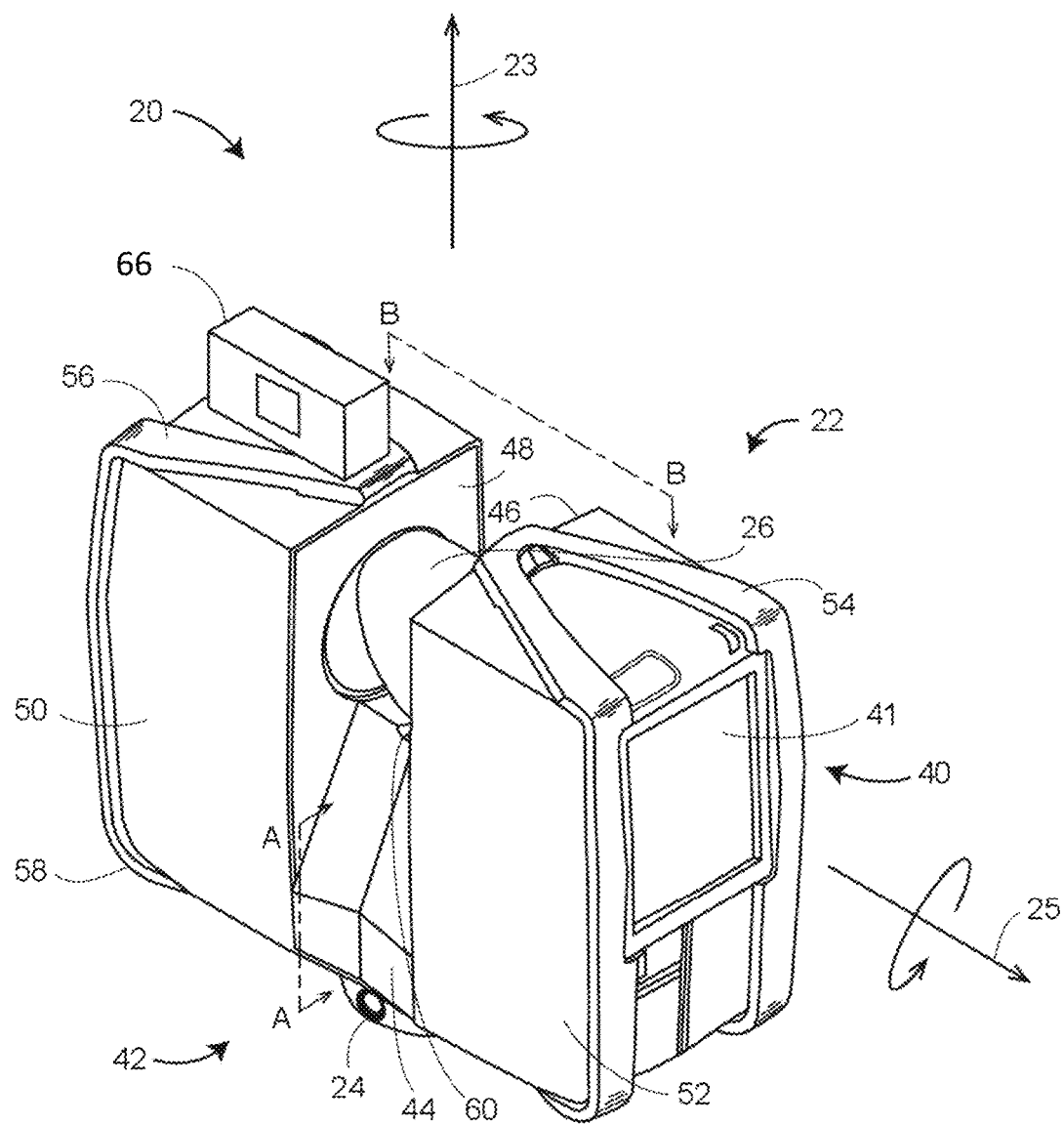
FIG. 1 is a perspective view of a laser scanner in accordance with an embodiment.
Figure 2:
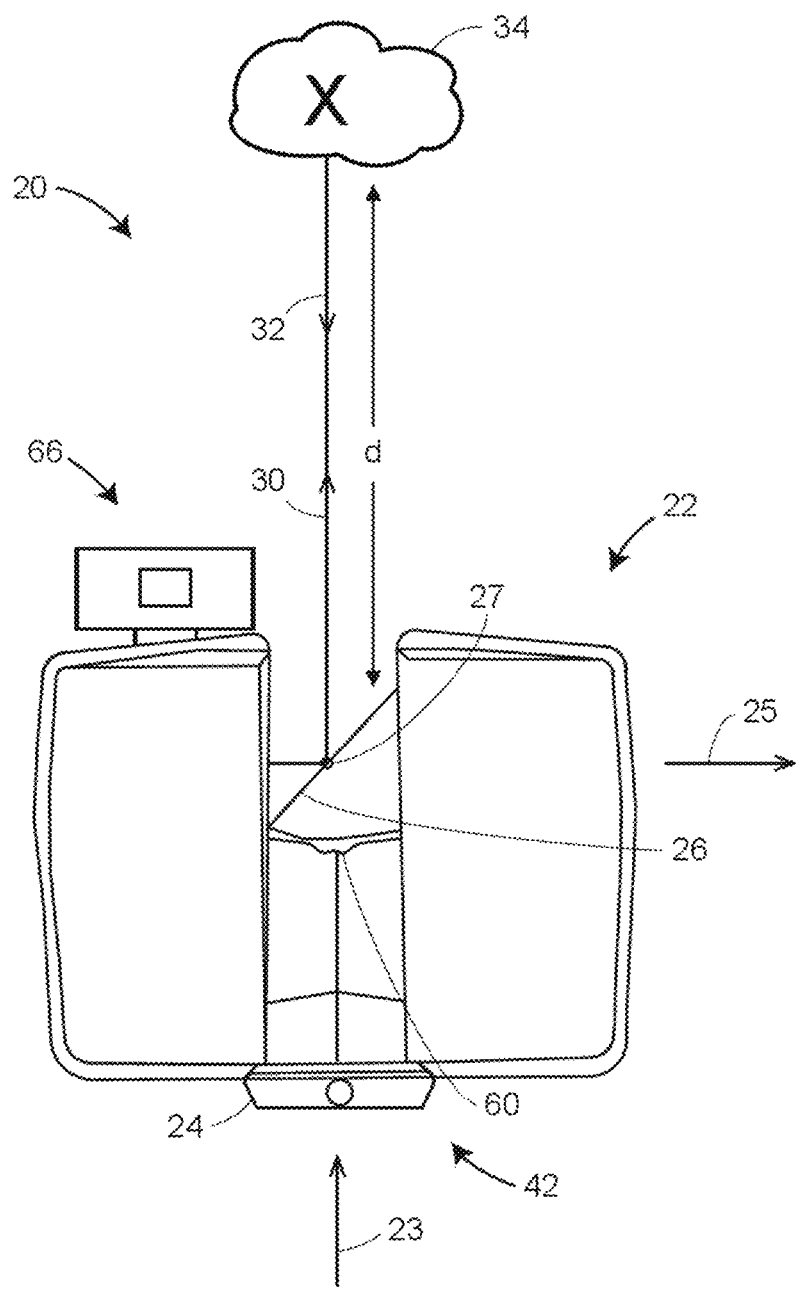
FIG. 2 is a side view of the laser scanner illustrating a method of measurement according to an embodiment.
Figure 3:
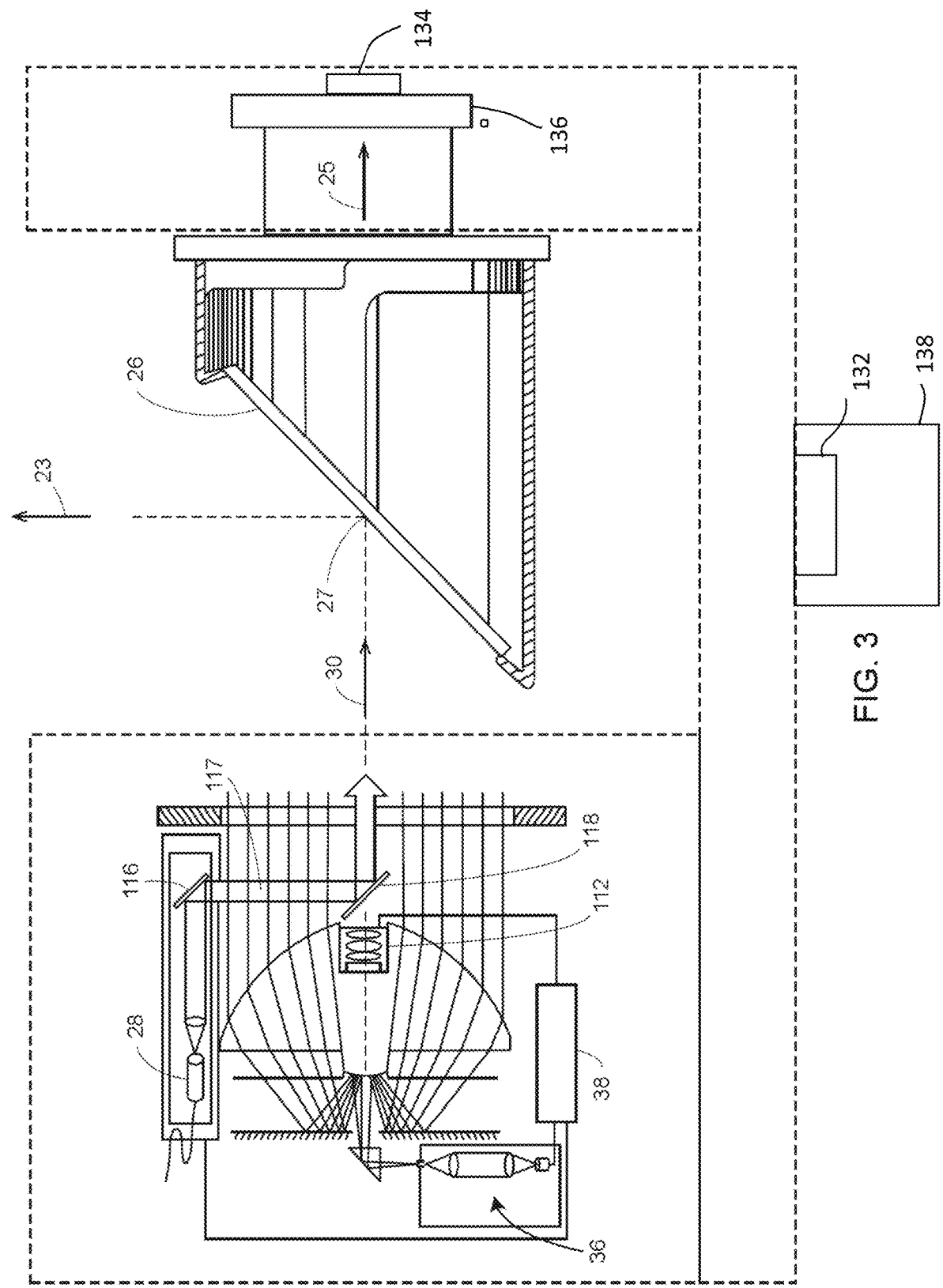
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to the term "vertical axis."

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example, 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity-modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light-receiver 36. The directions of the emitted light beam 30 and of the reflected light beam 32 result from the angular positions of the rotary mirror 26 and the measuring head 22 about the axes 25 and 23, respectively. These angular positions, in turn, depend on the corresponding rotary drives or motors.

Coupled to the light emitter 28 and the light-receiver 36 is a controller 38. The controller 38 determines, for a multitude of measuring points X (FIG. 2), a corresponding number of distances d between the laser scanner 20 and the points X on object 34. The distance to a particular point X is determined based at least in part on the speed of light in air through which electromagnetic radiation propagates from the device to the object point X. In one embodiment, the phase shift of modulation in light emitted by the laser scanner 20 and the point X is determined and evaluated to obtain a measured distance d.

The speed of light in air depends on the properties of the air, such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally, and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in the air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light-receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite base 24. Shells 50, 52 are coupled to walls 46, 48 and cover the components of the laser scanner 20. In the exemplary embodiment, the shells 50, 52 are made from a plastic material, such as polycarbonate or polyethylene, for example. The shells 50, 52 cooperate with the walls 46, 48 to form a housing for the laser scanner 20.

On the end of the shells 50, 52 opposite the walls 46, 48, a pair of yokes 54, 56 are arranged to partially cover the respective shells 50, 52. In the exemplary embodiment, the yokes 54, 56 are made from a suitably durable material, such as aluminum, for example, that assists in protecting the shells 50, 52 during transport and operation. The yokes 54, 56 each includes a first arm portion 58 that is coupled, such as with a fastener, for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48, and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52, and the measuring head 22 from damage during transportation and operation. In other embodiments, the yokes 54, 56 may include additional features, such as handles to facilitate the carrying of the laser scanner 20 or attachment points for accessories, for example.

On top of the traverse 44, a prism 60 is provided. The prism extends parallel to the walls 46, 48. In the exemplary embodiment, prism 60 is integrally formed as part of the carrying structure 42. In other embodiments, prism 60 is a separate component that is coupled to the traverse 44. When mirror 26 rotates, during each rotation the mirror 26 directs the emitted light beam 30 onto the traverse 44 and the prism 60. Due to non-linearities in the electronic components, for example, in the light-receiver 36, the measured distances d may depend on signal strength, which may be measured in optical power entering the scanner or optical power entering optical detectors within the light-receiver 36, for example. In an embodiment, a distance correction is stored in the scanner as a function (possibly a nonlinear function) of distance to a measured point, and optical power (generally unscaled quantity of light power sometimes referred to as "brightness") returned from the measured point and sent to an optical detector in the light-receiver 36. Since prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be but is not limited to a pyrometer, a thermal imager, an ionizing radiation detector, or a millimeter-wave detector. In an embodiment, the auxiliary image acquisition device 66 is a color camera with an ultrawide-angle lens, sometimes referred to as a "fisheye camera."

In an embodiment, a camera 112 is located internally to the scanner (see FIG. 3) and may have the same optical axis as the 3D scanner device. In this embodiment, camera 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, mirror 26 is rotated by a motor 136, and the angular/rotational position of the mirror is measured by angular encoder 134. The dichroic beam-splitter 118 allows light to pass through at wavelengths different than the wavelength of light 117. For example, the light emitter 28 may be a near-infrared laser light (for example, a light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. Camera 112 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
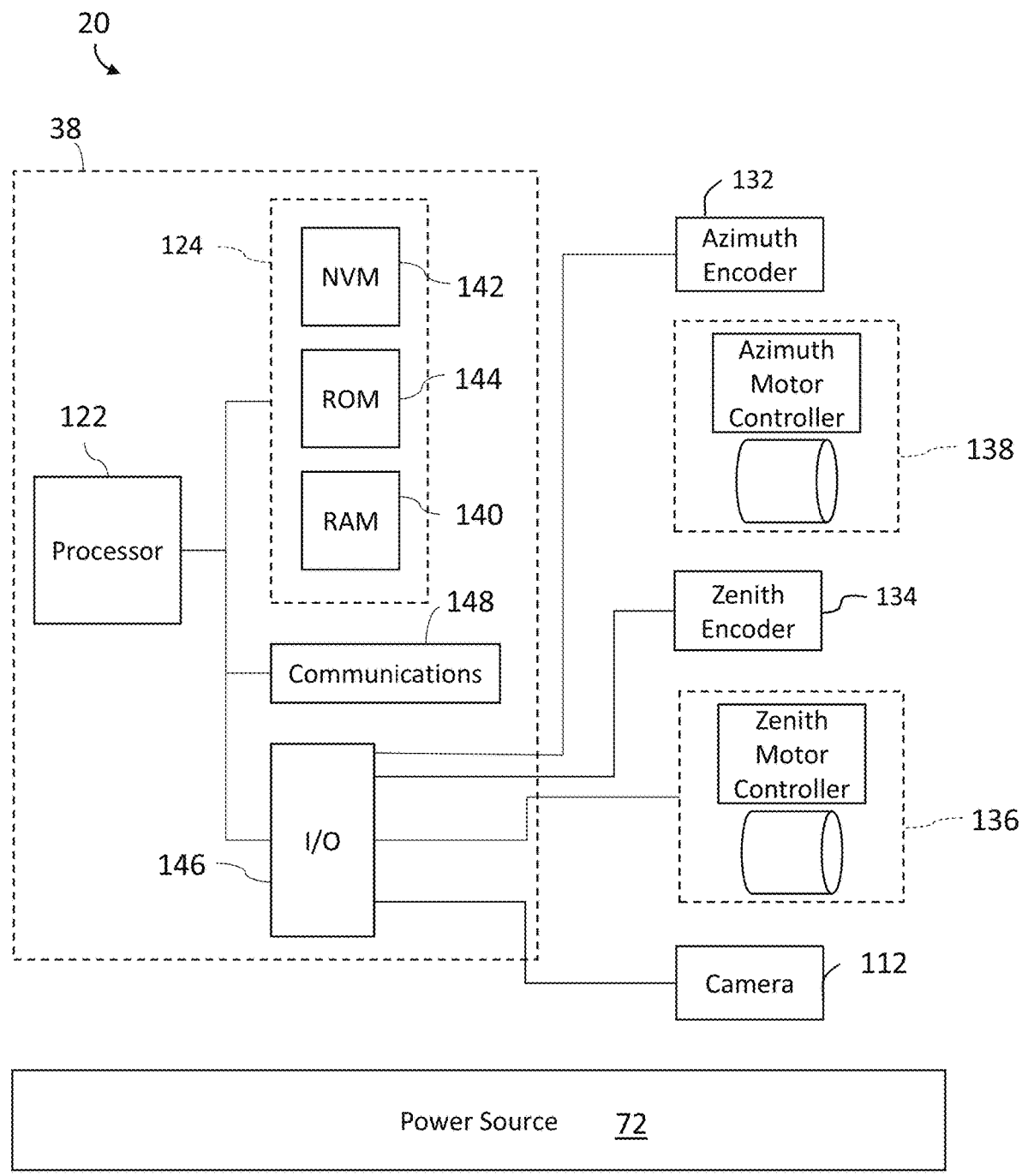
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. Controller 38 includes one or more processing elements 122. The processors may be microprocessors, field programmable gate arrays (FPGAs), digital signal processors (DSPs), and generally any device capable of performing computing functions. One or more processors 122 have access to memory 124 for storing information.

Controller 38 is capable of converting the analog voltage or current level provided by light-receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by the camera 112, angular/rotational measurements by a first or azimuth encoder 132, and angular/rotational measurements by a second axis or zenith encoder 134.

In general, controller 38 accepts data from encoders 132, 134, light-receiver 36, light source 28, and camera 112 and is given certain instructions for the purpose of generating a 3D point cloud of a scanned environment. Controller 38 provides operating signals to the light source 28, light-receiver 36, camera 112, zenith motor 136, and azimuth motor 138. In one or more embodiments, controller 38 also provides operating signals to the auxiliary image acquisition device 66. Controller 38 compares the operational parameters to predetermined variances and, if the predetermined variance is exceeded, generates a signal that alerts an operator to a condition. The data received by controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touchscreen display, or the like. A keypad may also be coupled to the user interface for providing data input to controller 38. In one embodiment, the user interface is arranged or executed on a mobile computing device that is coupled for communication, such as via a wired or wireless communications medium (e.g., Ethernet, serial, USB, Bluetooth™, or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby, and any combination or derivative of at least one of the foregoing.

Figure 5:
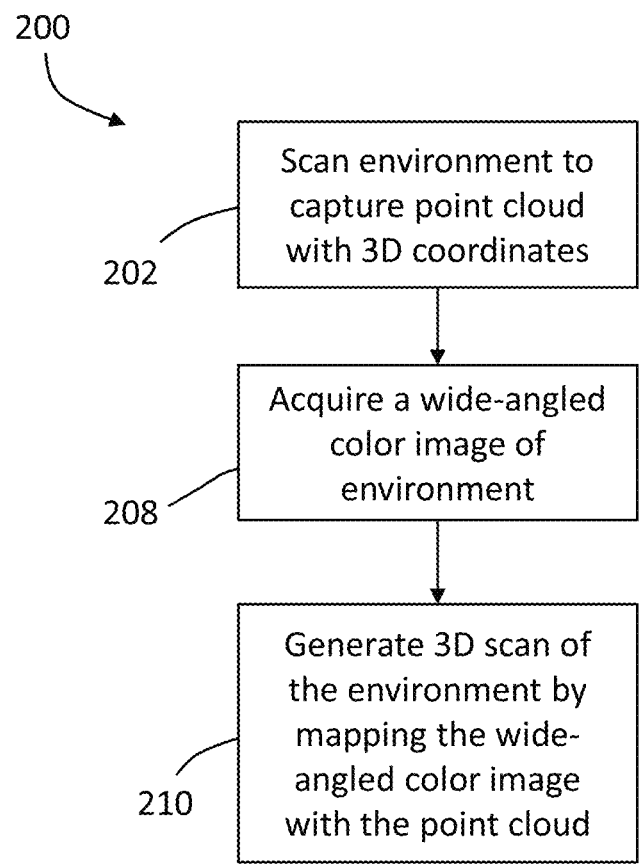
FIG. 5 is a flow diagram of a method of generating enhanced color scans with the laser scanner of FIG. 1.

Referring now to FIG. 5, an embodiment of a method 200 is shown for generating a scan of the environment with scanner 20. Method 200 begins in block 202, where the environment in which scanner 20 is positioned is scanned. As described herein, the volume (e.g., the scan area) around the laser scanner 20 is performed by rotating the rotary mirror 26 relatively quickly about axis 25 while rotating the measuring head 22 relatively slowly about axis 23, thereby moving the assembly in a spiral pattern. Thus, for each light beam emitted, a distance value and the angles of the mirror 26 and the measurement head 22 are determined. Thus, a 3D coordinate of a point in the environment may be determined for each emitted and received light beam. Further, for each light beam, an intensity value of the returned light beam is measured.

The light beams are emitted and received as the measurement head 22 is rotated 180 degrees about axis 23. Method 200 further includes, at block 208, acquiring color images of the environment. In an embodiment, a 2D color image is acquired by the auxiliary image acquisition device 66. The single 2D image acquired using the ultrawide-angle lens captures color data in the spherical volume surrounding the laser scanner 20. In the exemplary embodiment, the 2D acquired color image is in an RGB color model. In other embodiments, other color models, e.g., cyan, magenta, and yellow (CMY), or cyan, magenta, yellow, and black (CMYK), or any other color model, can be used.

Once the 2D color image is acquired, method 200 includes, at block 210, generating a colorized 3D scan by mapping the 2D ultrawide-angle image with the 3D coordinates in the point cloud captured by the scanner 20. Such mapping of the 2D ultrawide-angle image with the 3D point cloud is described further herein.

It should be appreciated that method 200 provides advantages in generating enhanced color 3D scans over techniques that use HDR (High Dynamic Range) imaging techniques because of requiring a fewer number of images to be captured by using an ultrawide-angle field of view.

Physical agents living in complex environments, such as humans and animals, need two types of visual sensing abilities. One is to focus on objects with a precise but small retina, and the other is to look around the environment with a wide but coarse retina. Both visual sensing mechanisms are required to enable robust and flexible visual behaviors. In particular, the wide visual information obtained by looking around is necessary to monitor wide areas and to avoid dangerous situations. If the complete surrounding in space can be involved in the perception process, orientation and navigation in space become easier and more reliable.

Typically, a camera's field of view is smaller than the human field of view, which limits objects from being captured in a single picture. This technical challenge is addressed by using an ultrawide-angle, i.e., hemispherical or fisheye lens, which creates a wide field of view image. With an ultrawide-angle lens, an image of more than 180° angular field of view can be acquired. Due to the large field of view, it has been used in many applications with different domains such as forestry, the study of plant canopies, geodesy to produce a site obstruction diagram for future GPS missions, etc.

Technical challenges of using such an ultrawide-angle lens include lateral color, high order distortion (edge compression), loss of resolution, and severe drop-off of illumination at the full field (e.g., 180°), which limit applications of the ultrawide-angle lenses for precise photogrammetric applications.

Embodiments of the technical solutions described herein address such technical challenges and facilitate using the ultrawide-angle lens to acquire 2D color images and mapping such images to the 3D coordinates in the point cloud. Further, technical effects and benefits of some embodiments include providing a 3D scanner system that rapidly acquires 3D coordinates of a collection of points in a scan area with accurate color information using the single ultrawide-angle 2D color image. In one or more embodiments, the auxiliary image acquisition device 66 can be an omnidirectional camera such as a RICOH® THETA® camera, for example. Camera 66 can capture a 360° view of the environment by capturing two images substantially concurrently. The two images may be captured by two ultrawide-angle lenses that are positioned to be facing in opposite directions, each camera capturing a respective field of at least 180°. In some cases, the two images that are captured can have overlapping portions that can be combined/edited, either automatically or manually. It is understood that the above description provides some examples of the ultrawide-angle lens and auxiliary image acquisition device 66 that can be used in one or more embodiments and that in other embodiments, different lenses and/or cameras can be used.

Figure 6:
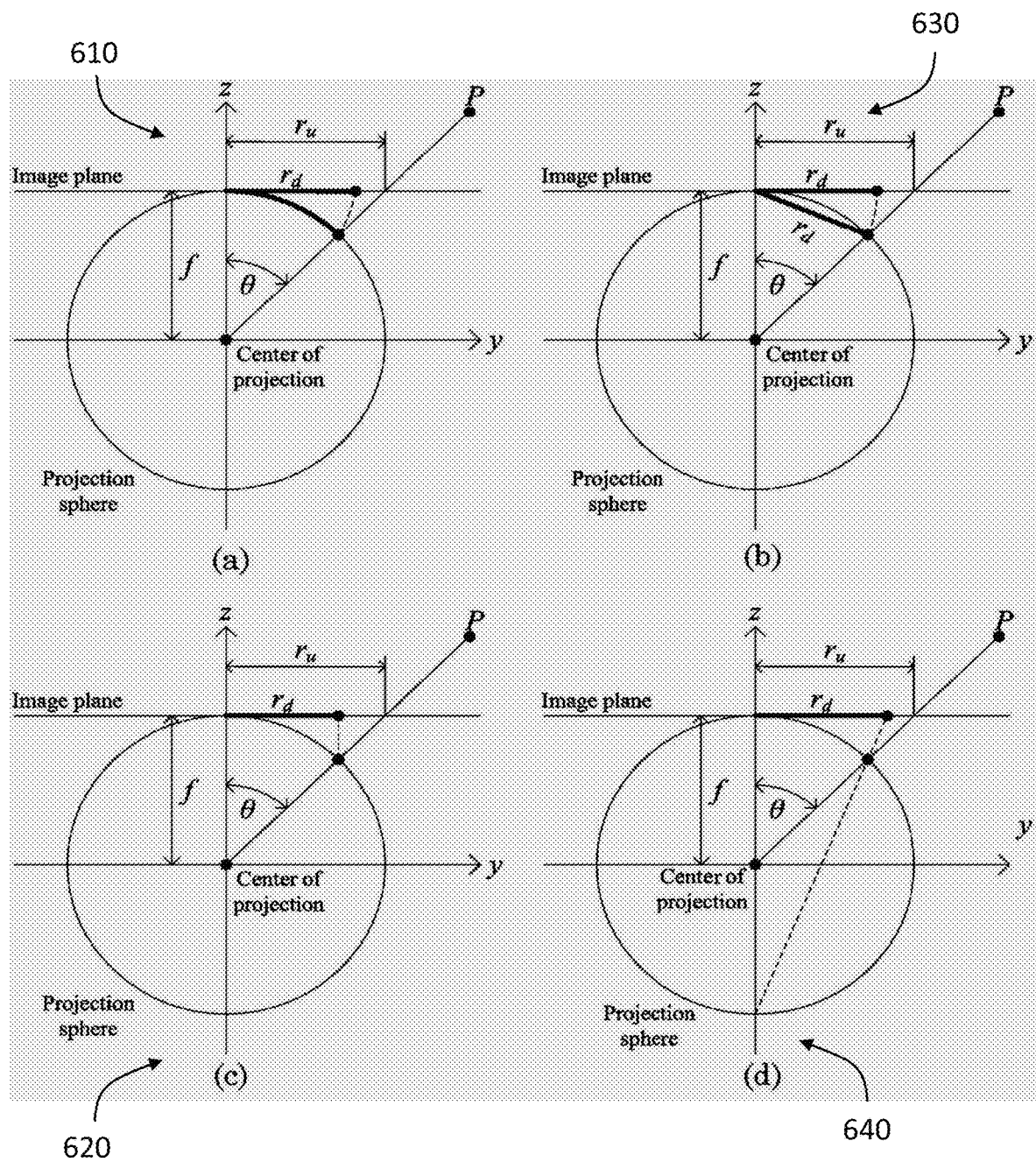
FIG. 6 depicts the projection types of ultrawide-angle (fisheye) lens and the path of light from a point in 3D space into the image plane.

FIG. 6 depicts determining coordinates corresponding to pixels representing objects/surfaces captured by an ultrawide-angle image according to one or more embodiments. A difference between an ultrawide-angle lens and a typical rectilinear lens is that the projection from a 3D point to a 2D image in the ultrawide-angle lens is intrinsically non-perspective. Depending on the amount of deviation of the ray, equations below and FIG. 6 provide four different types of projections that characterize ultrawide-angle lenses:

Equidistant projection (610): $r_d = c \cdot \theta$

Orthographic projection (620): $r_d = c \cdot \sin(\theta)$

Figure 7:
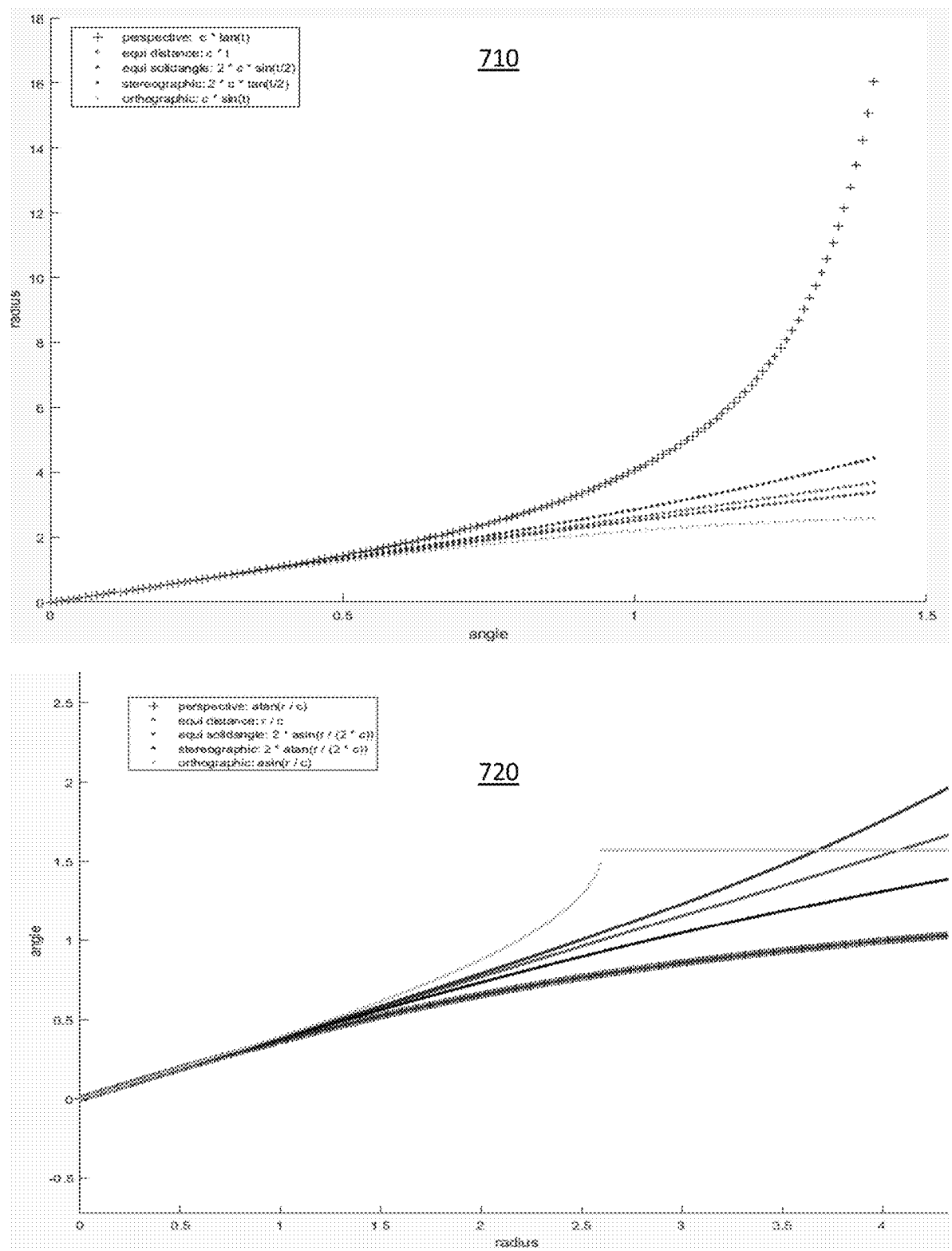
FIG. 7 shows the relation of radius and zenith angle (and reverse) for all ultrawide angle (fisheye) lens types at FIG. 6, including also the perspective projection.

Equisolid-angle projection (630): $r_d = 2c \cdot \sin\left(\frac{\theta}{2}\right)$ Stereographic projection (640): $r_d = 2c \cdot \tan\left(\frac{\theta}{2}\right)$ Here, $\theta$ is the zenith angle, c is a camera constant (in millimeters or pixels), and $r_d$ is the radius of the image point P (from the principal point). FIG. 7 shows the relation of radius and zenith angle (and reverse) for perspective projection and the four ultrawide-angle lens projection types 610, 620, 630, 640. Plot 710 shows that a lens with perspective projection requires an infinite image plane to projection near (and less) than 180° field of view. Plot 720 shows that orthographic projection-type cannot handle field of view near (and more) than 180°. Typically, lenses available are designed to produce an equidistant projection. For example, NIKON® 8-mm f/2.8, CANON® 7.5-mm f/5.6, SIGMA® 15-mm f/2.8 (180° FOV), NIKON® 6-mm (220° FOV), and RICOH® THETA® ultrawide-angle lens 2.6-mm (~204° FOV) are examples of equidistant projection ultrawide-angle lenses.

Collinearity equations represent a set of two equations used in photogrammetry and remote sensing to relate coordinates in a sensor plane (in two dimensions) to object coordinates (in three dimensions). Equation (1) represents collinearity equations for a 2D ultrawide-angle lens as used in one or more embodiments:

$$\left. \begin{array}{l} x = -\dfrac{c}{m} \cdot \dfrac{U_X}{U_Z} \\ y = -\dfrac{c}{m} \cdot \dfrac{U_Y}{U_Z} \end{array} \right\} \quad (1)$$

Here, (x, y) is the image point coordinates in the photo coordinate system (e.g., millimeter or pixels), c is the camera constant, m is an ultrawide-angle lens coefficient factor (unit free). The ($U_X$, $U_Y$, and $U_Z$) are intermediate values that can be computed as follows:

$$\begin{pmatrix} U_X \\ U_Y \\ U_Z \end{pmatrix} = R^t \cdot \begin{pmatrix} X - X_0 \\ Y - Y_0 \\ Z - Z_0 \end{pmatrix}$$

Here, ($X_0$, $Y_0$, $Z_0$) is the position of the center of projection (see FIG. 6), and (X, Y, Z) is the resulting object point coordinates in 3D space and $R = R_X R_Y R_Z$, in which:

$$R_X = \begin{pmatrix} 1 & 0 & 0 \\ 0 & \cos(\omega) & -\sin(\omega) \\ 0 & \sin(\omega) & \cos(\omega) \end{pmatrix}, R_Y = \begin{pmatrix} \cos(\varphi) & 0 & \sin(\varphi) \\ 0 & 1 & 0 \\ -\sin(\varphi) & 0 & \cos(\varphi) \end{pmatrix}, \text{ and}$$

$$R_Z = \begin{pmatrix} \cos(\kappa) & -\sin(\kappa) & 1 \\ \sin(\kappa) & \cos(k) & 1 \\ 0 & 0 & 1 \end{pmatrix}$$

Where ($\omega$, $\varphi$, $\kappa$) are the three rotation angles around the X, Y, and Z axes, respectively. The point at coordinates (X, Y, Z) in the 3D point cloud is mapped and colorized with the pixel at (x, y) from the 2D ultrawide-angle image as a result of the above calculations.

Only the equidistant projection (610) and the equisolid-angle projection (630) types can properly model the Ricoh Theta ultrawide-angle lens. Accordingly, the examples described herein provide equations that are applicable for those two projection models. However, it is understood that other types of projection models can be used without significant changes to the description provided herein. For example, the following are the calculations for the lens coefficient, m, for the equidistant and the equisolid-angle projection types for the ultrawide-angle lens:

$$\text{Equidistant projection coefficient } m = -\frac{\tan(\theta)}{\theta}$$

$$\text{Equisolid-angle coefficient } m = -\frac{\tan(\theta)}{2 \cdot \sin\left(\frac{\theta}{2}\right)}$$

Figure 8:
FIG. 8 depicts a table that provides the domains and ranges of various trigonometric functions.

It should be noted that in the case of the ultrawide-angle lens of the auxiliary image acquisition device 66, the range of $\theta$ is [0, $\pi$]. Among the trigonometric functions, only the inverse of cosine or the inverse of cotangent returns the angle in the range of [0, $\pi$] (for the inverse of cotangent is (0, $\pi$)). Accordingly, one or more embodiments use the inverse of cosine (acos) to determine the angle theta. Inverse of sine or inverse of tangent does not have this property. If they are used in the formulation, they cannot determine the sign and the value of $\theta$ for incoming rays with $\theta$ near to $\pi/2$ or larger than $\pi/2$ (FOV of near to $\pi$ or larger than $\pi$). FIG. 8 depicts table 810 that provides the domains and ranges of various trigonometric functions. Based on these, the above-described calculations of the camera coefficient m are based on using the following computation for the angle $\theta$:

$$\theta = \cos^{-1}\left(-\frac{U_Z}{\sqrt{U_X^2 + U_Y^2}}\right)$$

The above-described calculation resolves the ambiguity of mapping the 3D point cloud captured by the laser scanner 20 to pixels from the 2D ultrawide-angle color image from the auxiliary image acquisition device 66 at near to or larger than zenith angle of 90°. By using the above techniques for calculating the angle $\theta$, embodiments described herein eliminate disambiguation of the sign and value of the angle $\theta$. Therefore, the coefficient m and the further calculations that use m are calculated correctly Typically, during mapping, an image to a point cloud, straight lines in the real world (i.e., point cloud) are mapped to straight lines in the image generated by the rectilinear camera. However, most real optical systems introduce some undesirable effects, rendering the assumption of the rectilinear camera model inaccurate. In the case of the auxiliary image acquisition device 66, a radial distortion (also referred to as "radial barrel distortion") causes points on the image plane to be shifted from their ideal position along a radial axis from the principal point in the ultrawide-angle image plane. The visual effect of this displacement in ultrawide-angle optics is that the image has a higher resolution in the foveal areas, with the resolution decreasing nonlinearly toward the peripheral areas of the image.

Typically, the following set of equations is used to determine correction terms to image point coordinates. The equations use additional parameters for modeling the systemic errors of frame array cameras with rectilinear lenses.

$$\left.\begin{array}{l}\Delta x = dx_0 - \dfrac{\bar{x}}{c}dc - S_x\bar{x} + a\bar{y} + \bar{x}(r^2 k_1 + r^4 k_2 + r^6 k_3) + \\ \qquad (r^2 + 2\bar{x})p_1 + 2\bar{x}\bar{y}p_2 \\ \Delta y = dy_0 - \dfrac{\bar{y}}{c}dc + a\bar{x} + \bar{y}(r^2 k_1 + r^4 k_2 + r^6 k_3) + 2\bar{x}\bar{y}p_1 + \\ \qquad (r^2 + 2\bar{y})p_2 \end{array}\right\} \quad (2)$$

Here, dc is a correction to camera constant c, $(dx_0, dy_0)$ represents corrections to the shift of principal point $(x_0, y_0)$, $(S_x, a)$ are affine transformation parameters: scale difference and shear, $k_1, k_2, k_3$ are parameters of radial lens distortion, and $p_1, p_2$ are parameters of decentering lens distortion.

It is known that in modern electronic sensor manufacturing, the terms $(S_x, a)$ are negligible; therefore, equations (2) consists of 8 camera calibration parameters which are determined through the process of camera self-calibration. A technical challenge is that such camera calibration parameters introduce systemic errors that inhibit the accurate colorizing of the 3D point cloud using the single 2D ultra-wide-angle color image. It should be noted that although eight camera calibration parameters are depicted in equations (2), in other embodiments, there can be a different number of camera calibration parameters.

Embodiments herein address such technical challenges by facilitating calibration of the auxiliary image acquisition device 66, including cameras with ultrawide-angle lenses and/or rectilinear lenses.

Typically, camera calibration through self-calibration can be performed in three ways: first, block triangulation with free network; second, block triangulation with object space constraints, for example, control points or 3D straight lines; and third, space resection of individual images using control points. In the first and second approaches, using bundle adjustment, the camera calibration parameters, the exterior orientation parameters of images, and the position of the object points are estimated simultaneously through a least-squares-optimization approach. Here, "bundle adjustment" is a known algorithm or process that is used in 3D construction techniques. Given a set of images depicting a number of 3D points from different viewpoints, bundle adjustment can be defined as the problem of simultaneously refining the 3D coordinates describing the scene geometry, the parameters of the relative motion, and the optical characteristics of the camera(s) employed to acquire the images, according to an optimality criterion involving the corresponding image projections of all points.

In the third approach, the control points are used, and only the camera calibration parameters and the external orientation parameters of the images are estimated simultaneously. In the case of the setup of the 3D scanner 20 and the auxiliary image acquisition device 66, the latter being fixed to the 3D scanner 20, the camera calibration has to be performed using the third approach that uses space resection of individual images using control points. This technique is now described.

Typically, in photogrammetry, a test-field of control points is built in order to calibrate a camera, such as the auxiliary image acquisition device 66, and to perform an accuracy testing of the calibration procedure. This control point test-field is typically measured with a technique, which has a better positioning accuracy compared to the intended accuracy that is aimed to be achieved after the camera calibration. Then, using the bundle adjustment process, the camera calibration parameters and exterior orientation parameters of the images are estimated simultaneously.

However, in the case of the 3D scanner 20 with the fixed auxiliary image acquisition device 66, the auxiliary image acquisition device 66 has to be calibrated at locations that are not in a control point test-field. Therefore, using a test-field of control points to perform a regular camera calibration for data captures at locations where the 3D scanner 20 is going to be used is not a practical approach. Accordingly, embodiments described herein facilitate dynamically building a test-field of control points by using a point cloud that is captured by the 3D scanner 20. The control points of this test-field are selected points from the point cloud.

Figure 9:
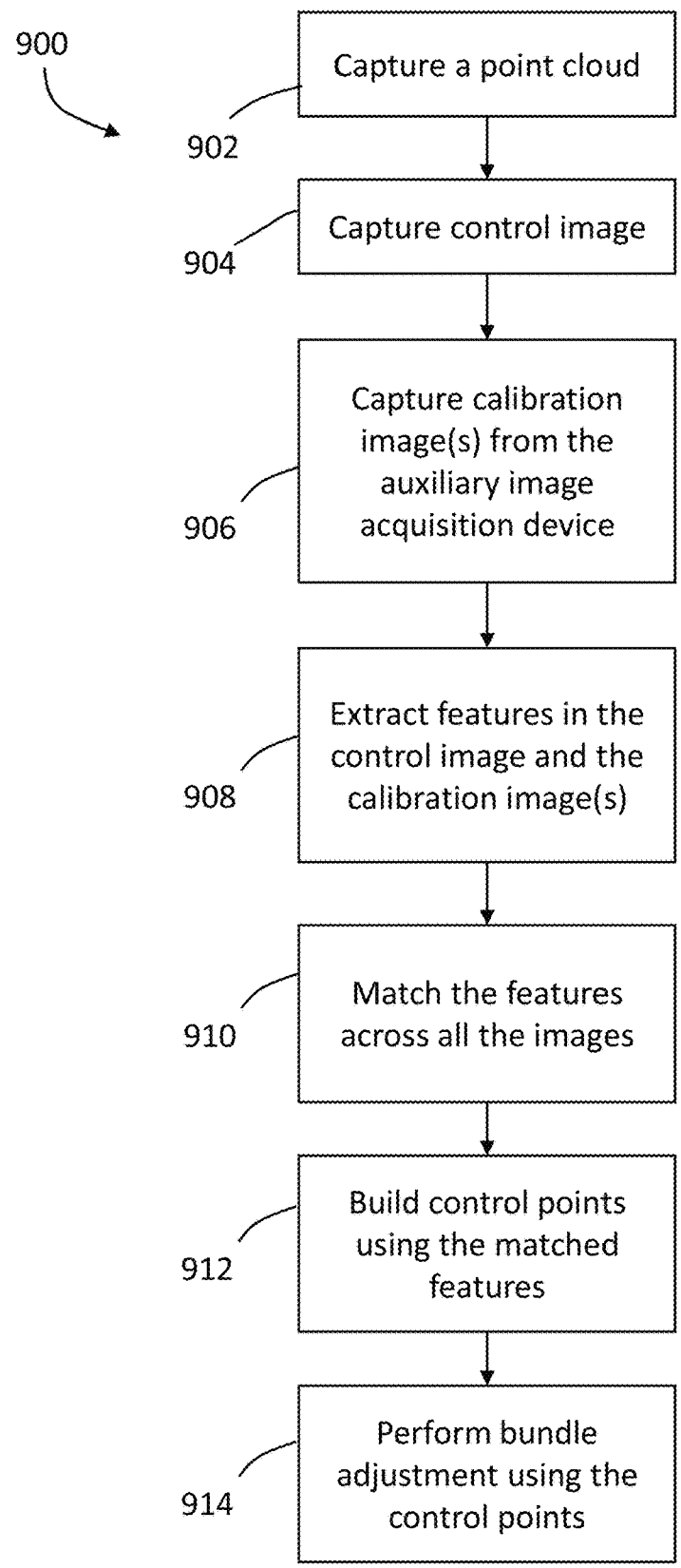
FIG. 9 depicts a flowchart for dynamic construction of control points for calibrating the auxiliary image acquisition device according to one or more embodiments.

FIG. 9 depicts a flowchart for dynamic construction of control points for calibrating the auxiliary image acquisition device according to one or more embodiments. Method 900 includes capturing a point cloud using the 3D scanner 20, at block 902. Further, a control image is captured using camera 112 that is integrated with the 3D scanner 20, at block 904. In one or more embodiments, multiple images are captured using the integrated camera 112, and the images are stitched together. Alternatively, in the case that the 3D scanner 20 does not have an integrated camera 112, an intensity image is captured and used as the control image. The intensity image does not have color information (e.g., Red, Green, Blue (RGB), or Cyan, Magenta, Yellow (CMY), etc.), rather has light intensity information at each captured pixel in the image. Further, calibration images are captured by the auxiliary image acquisition device 66, which is to be calibrated, at block 906.

Method 900 further includes extracting natural features in all of the images that are captured, at block 908. All of the images here include the control image taken by the internal camera 112 (or the intensity image) and the calibration images taken by the auxiliary image acquisition device 66. Feature extraction can be performed using one or more known algorithms such as Harris corner detector, Harris-Laplace-scale-invariant version of Harris detector, multi-scale oriented patches (MOPs), scale-invariant feature transform (SIFT), speeded up robust features (SURF), Features from accelerated segment test (FAST), binary robust invariant scalable key-points (BRISK) algorithm, oriented FAST and rotated BRIEF (ORB) algorithm, KAZE with M-SURF descriptor, and any other feature extraction technique. Some of the feature extraction techniques such as SIFT, SURF, BRISK, and ORB also provide descriptors for the extracted features. Alternatively, or in addition, any feature descriptor definition can be associated with the extracted features. For example, the following descriptor definitions can be used: normalized gradient, principal component analysis (PCA) transformed image patch, histogram of oriented gradients, gradient location and orientation histogram (GLOH), local energy-based shape histogram (LESH), BRISK, ORB, fast retina key-point (FREAK), and local discriminant bases (LDB).

In an embodiment, the feature extraction is based on a modified AKAZE algorithm which is executed on a graphics processing unit (GPU) to increase runtime efficiency. The descriptors assigned to the extracted features are the modified version of the M-SURF descriptors. The feature extraction results include a collection of points from each image, each point in the collection being an extracted "feature." The criteria for extracting such features can include detecting semantic features from the images such as corners, edges, doors, windows, etc. Alternatively, or in addition, the feature extraction can include detecting points that provide combinations of parameters that facilitate reducing the number of features required to be processed for effective feature matching. For example, such feature dimensionality reduction can include techniques such as principal component analysis (PCA), autoencoder, subspace learning, semidefinite embedding, isomap, partial least squares, etc.

Figure 10:
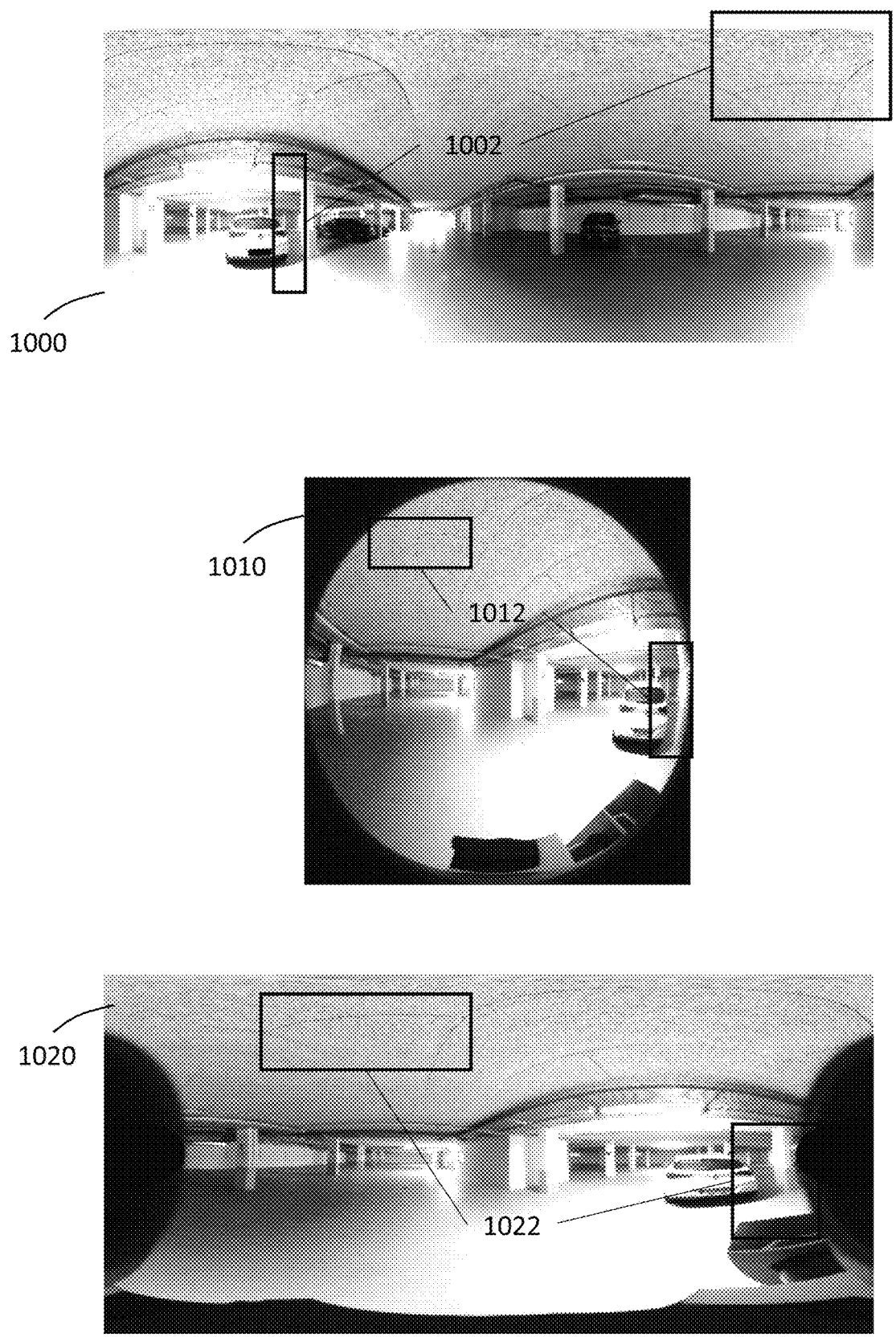
FIG. 10 depicts an example control image and calibration image used for dynamic construction of control points for calibrating the auxiliary image acquisition device according to one or more embodiments.

Typically, corresponding regions in the ultrawide-angle image calibration image from the auxiliary image acquisition image 66 and the control images (color or intensity) from the scanner 20 have large local geometrical deformation differences. It is due to different geometrical projection models. FIG. 10 shows a control image 1000 (color image) and the ultrawide-angle image 1010 and, for example, two corresponding image regions 1002, 1012 with a geometrical difference. These deformation differences limit the performance of feature matching and can result in a limited number of matching features, particularly around the rim of ultrawide-angle image 1010.

To address such a technical challenge, i.e., to reduce/eliminate the local deformation difference at corresponding regions, the ultrawide-angle image 1010 is converted to a spherical image 1020. This transformation is based on the ultrawide-angle sensor model described herein and using a mapping between the spherical image 1020 and the ultrawide-angle image 1010. By this transformation, the differences of local deformation at corresponding regions are minimized (comparing 1000 and 1020). Therefore, as a result, the feature descriptors become more similar, and more features are matched, especially around the nadir and zenith of the control image 1010.

In order to establish the mapping function from the ultra-wide-angle image points (x, y) to spherical image pixels (col, row), the space vector of the pixels of the ultra-wide-angle image is computed as follows:

$$s = \begin{pmatrix} x + \Delta x \\ y + \Delta y \\ -\dfrac{c}{m} \end{pmatrix}$$

in which x, y, c, and m are defined in equation (1) and $\Delta x$, $\Delta y$ are defined in equation (2). The space vector is then normalized $$\left(s = \dfrac{s}{\|s\|}\right).$$

"s" is in the 3D Cartesian coordinate system with unit length. By converting the Cartesian coordinate system to a Polar coordinate system, $(\theta, \varphi)$ are computed. $\theta$ is the azimuth angle with a range from $[0, 360°]$. $\varphi$ is the zenith angle with the range $[0, 90°]$. The pixel in the spherical image (col, row) is computed by dividing $(\theta, \varphi)$ using the pitch angle. The pitch angle is computed by dividing the pixel pitch of the external camera by its camera constant.

Further, method 400 includes matching the features that are extracted across all of the images, at block 910. A K-nearest neighbor (KNN) similarity search algorithm can be used here for feature matching. KNN similarity search algorithm is a non-parametric method used for classification and regression. The process of feature matching is time-consuming. Hence, to speed up the computation, approximated nearest neighbor search like the FLANN algorithm can be performed in one or more embodiments. FLANN is a library for performing fast approximate nearest neighbor searches in high dimensional spaces. It should be noted that the feature matching is not limited to a specific algorithm and that in other embodiments, the feature matching can be performed by executing algorithms that can be run on GPU like those in the libraries like FAISS, etc.

Figure 11:
FIG. 11 shows matching features between a control image and a calibration image in an example scenario according to one or more embodiments.
Figure 11:

FIG. 11 depicts corresponding features between the color image 1000 and the ultrawide-angle image 1010. The resulting match 1100 is a result of matching features extracted from the ultrawide-angle image 1010 and the control image 1000. In the depicted example, 694 features are matched by using the ultrawide-angle image 1010 and the control image 1000. In the second case, the resulting match 1110 is a result of matching features extracted from the control image 1000 and the spherical image 1020, which is obtained by transforming the ultrawide-angle image 1010 to the spherical image space. Here, the resulting match 1110 includes 1657 matching features. It is understood that the number of features that are extracted and matched can be different in different embodiments based on the extraction technique and the matching technique that is used. It should be noted that the matched features from the spherical image 1020 have been transferred to the ultrawide-angle image 1010 using a reverse transformation from the spherical image space to the ultrawide-angle image space.

At block 912, the 3D coordinates of matched features are estimated using the 3D point cloud. The control image, the calibration image, and the 3D point cloud are captured by camera 112, the auxiliary image acquisition device 66, and the 3D scanner 20, respectively, from the same position/location in the 3D space. Because the extracted features have sub-pixel accuracy, estimating their 3D coordinates requires more than picking a corresponding point to the feature from the point cloud. In an embodiment, a bilinear interpolation is used to estimate the 3D coordinates of the matching features. Bilinear interpolation is an extension of linear interpolation for interpolating functions of two variables (e.g., x and y) on a rectilinear 2D grid. Bilinear interpolation is performed using linear interpolation first in one direction and then again in the other direction. Although each step is linear in the sampled values and in the position, the interpolation is not linear but rather quadratic in the sample location.

In an example, the control image 1000, which is captured by the internal camera 112, is mapped with the 3D point cloud. The 3D coordinate of the matched feature is estimated by identifying the pixel/sub-pixel where the matched feature maps. As noted earlier, if the matched feature maps to a sub-pixel, the surrounding coordinates are used to perform the bilinear interpolation to determine the 3D coordinate of the matched feature.

It should be noted that other techniques can also be used for estimating the 3D coordinates of the features. For example, other interpolation approaches like bicubic interpolation can be used in other embodiments. The 3D coordinates of the features are stored as the control points.

Referring to the flowchart in FIG. 9, at block 914, calibration of the auxiliary image acquisition device 66 with the ultrawide-angle lens (single camera) is done by using a numerical approach using "bundle adjustment" with camera self-calibration. Given a set of images depicting a number of 3D points from different viewpoints, "bundle adjustment"

can be defined as the problem of simultaneously refining the 3D coordinates describing the scene geometry, the parameters of the relative motion, and the optical characteristics of the camera(s) employed to acquire the images, according to an optimality criterion involving the corresponding image projections of all points. In order to improve the reliability of bundle adjustment, embodiments herein extend the bundle adjustment by using image clusters. Here, the unknowns, i.e., the calibration parameters of the auxiliary image acquisition device 66, are estimated simultaneously for a cluster of images using the least-squares optimization approach.

An image cluster is defined as a group of images. They have a constant relative orientation among each other. For example, an image cluster can be defined by the left and right images captured by a dual camera 1200 (FIG. 12), such as RICOH THETA®. The dual camera includes a left camera 1202 and a right camera 1204. It is understood that the two cameras, 1202, 1204 can be labeled using any other labels, such as a first camera, a second camera, etc. Each image cluster includes at least one image captured by the left camera 1202 and a corresponding image captured by the right camera 1204. Each image cluster has at least six exterior orientation parameters that according to which the cluster is oriented and positioned in 3D space. Based on the geometry of the dual camera 1200, at least three conditions can be imposed to the relative position of the dual camera 1200:

$\Delta X=0$, the two cameras (left and right) are at the same X-coordinate position; $\Delta Y=0$, the two cameras (left and right) are at the same Y-coordinate position; and $\Delta Z=z$ mm, the two cameras (left and right) have a spacing distance equal to z mm. Here, the above values can be configured according to the geometry of the auxiliary image acquisition device 66. For example, z=15 mm, 19 mm, 27 mm, etc.; x=0, 5 mm, 10 mm, etc.; and y=0, 5 mm, 10 mm, etc.

Based on the conditions, the bundle adjustment is modified in embodiments herein so that the relative orientation parameters of the images of a cluster and the exterior orientation parameters of the image clusters are estimated simultaneously together with camera calibration parameters. If the relative orientation of the images of a cluster is known in advance, they can be used as constraints or conditions.

In one or more embodiments, the calibration and the configuration of the calibration parameter values are performed using the scanner system in the field. This improves the efficiency of the usage of the scanner system. Without the features described herein, the scanner system, with the auxiliary image acquisition device 66, had to be pre-calibrated in a controlled environment.

In one or more embodiments of the present invention, once the auxiliary image acquisition device 66 is calibrated using method 900, the scanner system can be calibrated to determine one or more correction factors based on the sensor model of the auxiliary image acquisition device 66. The correction factors are subsequently applied to each of the 2D coordinates of the images acquired by the auxiliary image acquisition device 66.

The corrected coordinates of the image, together with the exterior orientation of images of the external camera, are used during the colorization of the 3D point cloud in method 200 (block 210). Accordingly, the 3D scan generated by the scanner system is colorized more accurately by embodiments described herein compared to existing solutions.

Figure 12:
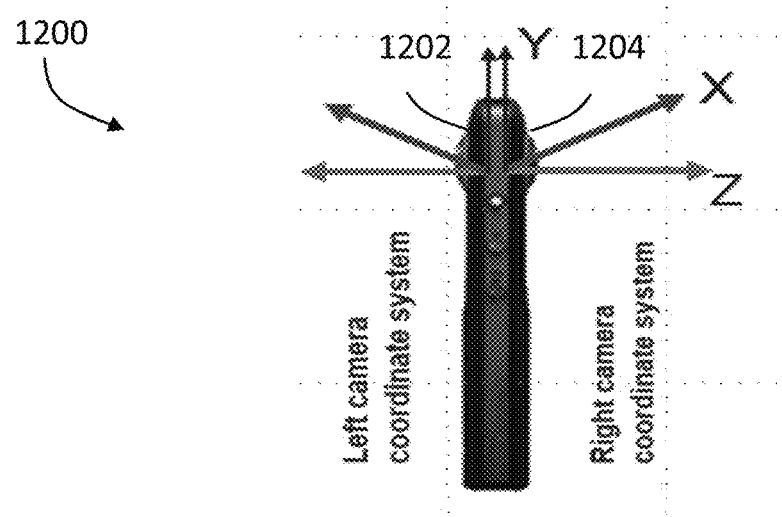
FIG. 12 depicts an example auxiliary image acquisition device according to one or more embodiments.
Figure 13:
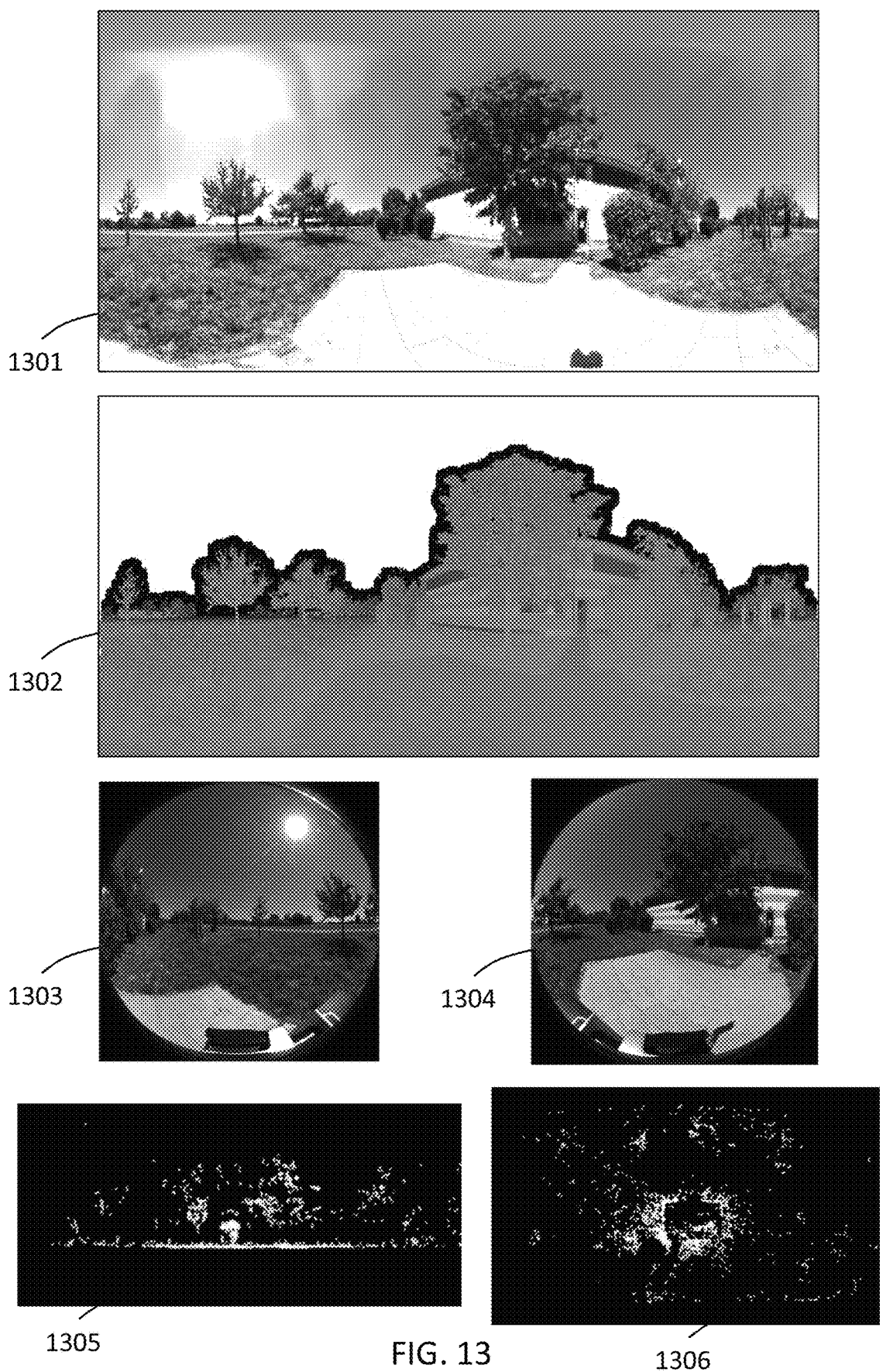
FIG. 13 depicts an example result in an example scenario according to one or more embodiments.

FIG. 13 depicts an example result from embodiments described herein. In an outdoor setting, control images 1301, 1302 are captured as laser panoramas. A color image 1301 is computed by stitching the images taken from the built-in camera 112 of the laser scanner 20. Further, a laser intensity image 1302 can be measured directly by the laser scanner 20. Further shown are calibration images 1303, 1304 taken by the auxiliary image acquisition device 66, in this case, a left image 1303, and a right image 1304 captured by a dual camera (FIG. 12). The constructed control points based on these images are shown in a side view 1305 and a top view 1306. All camera calibration parameters and the exterior orientation parameters of the individual images were estimated successfully by using the control points and the bundle adjustment by using image clusters, as described herein. It should be noted that although an outdoor setting is shown in the example results in FIG. 13, embodiments herein address the technical challenges described herein in indoor settings as well.

Embodiments described herein facilitate camera self-calibration, which works based on space resection using a test-field of control points. Embodiments described herein facilitate the test-field of control points to be established dynamically at the worksite (field). Further, to address technical challenges, embodiments herein also modify feature extraction to increase the number of control points that can be extracted, and consequently, that can be matched between control images and calibration images. Further, bundle adjustment is modified by using image clusters in order to handle additional constraints/conditions that are to be imposed because of a dual camera with ultrawide-angle lenses.

As a result, embodiments described herein address the technical problem of camera calibration reliably, even in scenarios that typically have a low number of control points and inhomogeneous distribution of control points in 360° field of view provided by an ultrawide-angle lens. Accordingly, using embodiments described herein, with one image from each camera (1202, 1204) in a dual camera (1200), the camera calibration parameters can be estimated reliably and accurately.

The accuracy of control points resulting from embodiments described herein is limited only by the accuracy of stitching the images of the internal camera 112 of the laser scanner 20 to generate a control image 1000. The reliability of embodiments described herein depends on the feature distribution and the number of features that can be extracted in the 360° field of view of the ultrawide-angle lenses. The results from several example studies (e.g., FIG. 13) have shown that the number of features and the distribution facilitates a reliable and accurate camera calibration using embodiments described herein.

Embodiments described herein accordingly provide a practical application to improve the operation of a 3D scanner, particularly a 3D scanner that uses an auxiliary image acquisition device equipped with an ultrawide-angle lens. Embodiments described herein facilitate the auxiliary image acquisition device to be calibrated using self-calibration using control points that are generated dynamically, at runtime, on the worksite, without requiring expensive and time-consuming steps of setting up a controlled environment. Such camera calibration is the prerequisite of all 3D measurement applications.

Apart from the camera calibration process, embodiments described herein can be used within the process of coloring a point cloud that is captured by the scanner 20, at least in the following modes: static scanning and dynamic scanning (e.g., FARO® SWIFT®).

It should be appreciated that while embodiments herein describe the reduction of the image point residuals with reference to the use of the camera with the ultrawide-angle lens and a three-dimensional scanner, this is, for example, purposes and the claims should not be so limited. In other embodiments, the residual reduction could be used in other applications that use an omnidirectional camera or a camera with a single ultrawide-angle lens to improve the accuracy of the image.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
   a three-dimensional (3D) scanner that captures a 3D point cloud that comprises a plurality of 3D coordinates corresponding to one or more objects scanned in a surrounding environment;
   a camera that captures a control image by capturing a plurality of images of the surrounding environment, wherein images from the plurality of images are stitched to form the control image;
   an auxiliary camera that captures a calibration image by acquiring an ultrawide-angle image of the surrounding environment; and
   one or more processors that dynamically calibrate the auxiliary camera using the 3D point cloud, the control image, and the calibration image, wherein calibrating the auxiliary camera comprises:
      extracting a first plurality of features from the control image using a feature-extraction algorithm;
      extracting a second plurality of features from the calibration image using the feature-extraction algorithm;
      determining a set of matching features from the first plurality of features and the second plurality of features by using a feature-matching algorithm;
      building a set of control points using the set of matching features by determining points in the 3D point cloud that are corresponding to the set of matching features; and
      performing self-calibration of the auxiliary camera using the set of control points.

2. The system of claim 1, wherein the ultrawide-angle image used as the calibration image has an angular field of view of at least 180°.

3. The system of claim 1, wherein extracting the second plurality of features from the calibration image comprises:
   transforming the ultrawide-angle image to a spherical image; and
   extracting the second plurality of features from the spherical image.

4. The system of claim 1, wherein the auxiliary camera includes two lenses at predetermined offsets relative to each other.

5. The system of claim 4, wherein the offsets between the two lenses are used as conditions to perform the self-calibration of the auxiliary camera.

6. The system of claim 1, wherein determining the points in the 3D point cloud that are corresponding to the set of matching features is performed using bilinear interpolation.

7. The system of claim 1, wherein the camera is an integral part of the 3D scanner.

8. The system of claim 1, wherein the auxiliary camera is mounted on the 3D scanner at a predetermined position relative to the 3D scanner.

9. A method comprising:
   capturing, by a three-dimensional (3D) scanner, a 3D point cloud that comprises a plurality of 3D coordinates corresponding to one or more objects scanned in a surrounding environment;
   capturing, by a camera, a control image by capturing a plurality of images of the surrounding environment, wherein images from the plurality of images are stitched to form the control image;
   capturing, by an auxiliary camera, a calibration image by acquiring an ultrawide-angle image of the surrounding environment; and
   dynamically calibrating, by one or more processors, the auxiliary camera using the 3D point cloud, the control image, and the calibration image, wherein calibrating the auxiliary camera comprises:
      extracting a first plurality of features from the control image using a feature-extraction algorithm;
      extracting a second plurality of features from the calibration image using the feature-extraction algorithm;
      determining a set of matching features from the first plurality of features and the second plurality of features by using a feature-matching algorithm;
      building a set of control points using the set of matching features by determining points in the 3D point cloud that are corresponding to the set of matching features; and
      performing self-calibration of the auxiliary camera using the set of control points.

10. The method of claim 9, wherein the ultrawide-angle image used as the calibration image has an angular field of view of at least 180°.

11. The method of claim 9, wherein extracting the second plurality of features from the calibration image comprises:
    transforming the ultrawide-angle image to a spherical image; and
    extracting the second plurality of features from the spherical image.

12. The method of claim 9, wherein the auxiliary camera includes two lenses at predetermined offsets relative to each other.

13. The method of claim 12, wherein the offsets between the two lenses are used as conditions to perform the self-calibration of the auxiliary camera.

14. The method of claim 9, wherein determining the points in the 3D point cloud that are corresponding to the set of matching features is performed using bilinear interpolation.

15. A computer program product, embedded on a non-transitory computer readable medium, comprising a memory device with computer executable instructions stored thereon, the computer executable instructions when executed by one or more processors cause the one or more processors to perform a method comprising:

dynamically calibrating, by one or more processors, an auxiliary camera of a three-dimensional (3D) scanner using a 3D point cloud, a control image, and a calibration image, wherein:
- the 3D point cloud comprises a plurality of 3D coordinates corresponding to one or more objects scanned in a surrounding environment, the 3D point cloud is captured by the 3D scanner;
- the control image is formed by stitching a plurality of images of the surrounding environment captured by a camera;
- a calibration image is an ultrawide-angle image of the surrounding environment captured by the auxiliary camera; and
- wherein calibrating the auxiliary camera comprises:
  - extracting a first plurality of features from the control image using a feature-extraction algorithm;
  - extracting a second plurality of features from the calibration image using the feature-extraction algorithm;
  - determining a set of matching features from the first plurality of features and the second plurality of features by using a feature-matching algorithm;
  - building a set of control points using the set of matching features by determining points in the 3D point cloud that are corresponding to the set of matching features; and
  - performing self-calibration of the auxiliary camera using the set of control points.

16. The computer program product of claim 15, wherein the ultrawide-angle image used as the calibration image has an angular field of view of at least 180°.

17. The computer program product of claim 16, wherein extracting the second plurality of features from the calibration image comprises:
- transforming the ultrawide-angle image to a spherical image; and
- extracting the second plurality of features from the spherical image.

18. The computer program product of claim 15, wherein the auxiliary camera includes two lenses at predetermined offsets relative to each other.

19. The computer program product of claim 18, wherein the offsets between the two lenses are used as conditions to perform the self-calibration of the auxiliary camera.

20. The computer program product of claim 15, wherein determining the points in the 3D point cloud that are corresponding to the set of matching features is performed using bilinear interpolation.

* * * * *